Patented Aug. 21, 1945

2,383,247

UNITED STATES PATENT OFFICE 2,383,247

TREATMENT OF CERTAIN SODIUM-SULPHUR COMPOUNDS TO PRODUCE CERTAIN SOLUBLE NONSULPHUR COMPOUNDS OF SODIUM

Daniel Gardner, New York, N. Y.

No Drawing. Application June 5, 1942,
Serial No. 445,966

5 Claims. (Cl. 23—63)

This invention relates to the treatment of certain sodium-sulphur compounds to produce certain soluble non-sulphur compounds of sodium, preferably by continuous process; as for example producing the compound sodium hydroxide or sodium carbonate from one of the sulphates or sulphides of sodium.

In the case of treating sodium sulphate, the reaction depends upon the fact that hydroxides and carbonates of certain of the alkaline earth metals will react with the sodium sulphate to produce in the one case sodium hydroxide, and in the other case sodium carbonate, and as a by-product in each case the sulphate of the alkaline earth. The basic reactions where the alkaline earth is calcium, are as follows:

$$Na_2SO_4 + Ca(OH)_2 \rightarrow 2NaOH + CaSO_4$$
$$Na_2SO_4 + CaCO_3 \rightarrow Na_2CO_3 + CaSO_4$$

These reactions are known to occur when using an aqueous solution of sodium sulphate $Na_2SO_4$ and adding to it lime water or a precipitate of calcium hydroxide in the one case or acid calcium carbonate or powdered calcium carbonate in the other case. Under such conditions, however, no industrially useful separation, such as indicated by the equations, takes place, and, therefore, from a practical standpoint, such reactions can serve no commercial purpose. Besides, some of the calcium sulphate formed is soluble in the resulting sodium hydroxide or sodium carbonate, and also, in the event that impurities are present in the limestone used to prepare the lime water or the calcium hydroxide or in the calcium carbonate, such impurities are likely to be found in the resulting alkaline solutions.

With this invention, however, it was discovered that if the starting materials are brought to molten condition, in this instance raised to a temperature above 884° C., the melting point of sodium sulphate, in a suitable furnace, the calcium hydroxide or carbonate, as the case may be, will be thoroughly incorporated in the sodium salt with the result that as the mixture leaves the furnace and is subjected to a jet of air and water, preferably hot, a reaction will take place in which substantially pure sodium hydroxide or sodium carbonate will be formed which, being soluble, can readily be separated from the calcium sulphate which is practically insoluble; while impurities that do exist will go with the calcium sulphate.

Referring further to the improved process and to the embodiment which results in sodium hydroxide, sodium sulphate obtained from natural deposits of that material or from any other source, is mixed with calcium hydroxide (slaked lime) in proportions giving an excess of the sulphate over that indicated by the reaction, and the mixture heated to a temperature higher than the melting point of the sulphate, above 884° C. but not exceeding 1200° C.

The heating is preferably affected in an electric or other suitable furnace under continuous feed, and the molten mass is uninterruptedly discharged at the bottom of the furnace where it meets a jet or jets of air and water.

The products, resulting from the reaction are passed to a suitable separator, as for instance, one with a stirrer which will cause the sodium hydroxide to overflow while the calcium sulphate, being practically insoluble in hot water, gradually settles down until the separation of the products is complete. Practically all of the impurities, if any, will remain with the calcium sulphate.

If, instead of sodium hydroxide, sodium carbonate is desired as a product of the process, this can be accomplished directly by reacting the molten stream of sulphate and hydroxide as it flows from the furnace with a jet or jets of carbon dioxide $CO_2$ and water, instead of air and water by which in effect the sodium hydroxide is converted to the carbonate. The combined reaction then is as follows:

$$Na_2SO_4 + Ca(OH)_2 + CO_2 \rightarrow Na_2CO_3 + CaSO_4 + H_2O$$

In this reaction, the calcium sulphate, being practically insoluble as compared with the sodium carbonate, it can be separated out in the same manner as the calcium sulphate from the sodium hydroxide when the latter is the resultant product.

The calcium hydroxide used in the reactions can be obtained from calcium carbonate either from natural limestone or prepared from calcium carbonate which, by calcination, can be readily transformed into quick-lime (CaO) in a lime kiln, the carbon dioxide given off during calcination, being collected separately and used in the combination carbon dioxide and water jet when the product desired is sodium carbonate. The calcium oxide from the lime kiln is treated with water to form slaked lime, $Ca(OH)_2$ to provide the calcium hydroxide for the described process. Preferably, a limestone of high purity is used in order to avoid, as much as possible, the presence of impurities in the calcium sulphate subsequently formed.

In another embodiment of the process, sodium sulphide $Na_2S$ alone is used as the starting material instead of sodium sulphate and calcium hydroxide; the sulphide being first heated in a suitable furnace at least to its melting point 920° C. and subjected, as it passes in molten state from the furnace, to a jet of air and water to produce sodium hydroxide and sulphuretted hydrogen or to a jet of CO₂ and water to produce sodium carbonate, the reactions being as follows:

$$Na_2S + 2H_2O \rightarrow 2NaOH + H_2S - 13.3 \text{ cal.}$$
$$Na_2S + CO_2 + H_2O \rightarrow Na_2CO_3 + H_2S + 27.5 \text{ cal.}$$

The sulphur in this reaction is discharged in the form of sulphuretted hydrogen H₂S from which sulphur is recoverable by well-established methods.

In order to insure that the process be carried on continuously, it is important that a proper lining be chosen for the furnace. It has been found by way of example that a carbon lining is particularly suitable, i. e., a lining of petroleum coke or graphite. Magnesite bricks have also been found suitable for the purpose. The prime requisite is that the furnace lining be neutral to the component elements which enter into the process. The otherwise waste heat developed during the process may be utilized for concentrating the resultant sodium hyroxide or carbonate solutions which are obtained and, as a final step, all products that are recovered are preferably brought to a state of commercial value.

There are other compounds that may be used to react with the initial sodium sulphate. For instance, lead oxide may be used, in which case the furnace temperature may be maintained in the neighborhood of 900° C., but still above 884°; and as the molten mixture meets the jet of water and air, sodium hydroxide and highly insoluble lead sulphate will be formed, which products can be easily separated. As lead sulphate decomposes at 1000° C., it can be heated and so decomposed yielding the oxide again for use in the process.

Barium carbonate could be used in place of limestone if it were economically available, since the resultant barium sulphate could be separated from the sodium compound with even greater ease than the calcium sulphate due to its lower solubility.

Also instead of starting with sodium sulphate, the corresponding acid salt NaHSO₄ could be used and treated with hydrated lime as in the process first described. Here, however, the temperature of the reaction would be lower, i. e., in the neighborhood of but not higher than about 450° C. In all other respects, the process would be the same.

In order to bring the temperature down, the reaction could be carried out as follows: in the initial stage some sulphuric acid is added, so as to transform the sodium sulphate into the bisulphate, NaHSO₄, thus permitting to work at a lower temperature.

Essentially, then, it will be seen that the invention contemplates the continuous decomposition of the initial sulphur compound of sodium in molten phase, with or without the addition of a reactive substance, such as calcium, barium or other hydroxide or carbonate; a stream of the molten mass being treated with an unbroken jet of air and water to yield sodium hydroxide or with carbon dioxide and water to yield sodium carbonate and with or without the addition of other ingredients that would tend to accelerate the reaction. By way of example, such accelerating ingredients may comprise small quantities of sodium silicate, sodium sulphide, sodium bicarbonate, sodium aluminate or the corresponding calcium compounds.

The process could also be carried out to produce sodium carbonate by initially admixing with the sodium sulphate, calcium carbonate directly but the economic advantages are not so pronounced because of the relatively high temperature to which the mixture would have to be heated, the melting point of calcium carbonate being 1339° C.

The various embodiments of the invention have been described merely by way of example, but obviously many variations and modifications could be made therein which would still be comprised within its spirit.

It is to be understood, therefore, that the invention is not limited to any specific embodiment, except insofar as such limitations are specified in the appended claims.

Having thus described my invention, what I claim is:

1. In a continuous process for the production of a sulphur-free sodium carbonate from a sodium-sulphur salt of the group consisting of sodium sulphate, sodium acid sulphate and sodium sulphide; the steps comprising heating a mixture of the starting sodium salt and a reacting agent of the group consisting of the hydroxide, oxide, and carbonate of the metals calcium, barium, and lead above the melting temperature of the mixture, flowing the molten mixture into water, and reacting it during such flow with water and carbon dioxide to produce sodium carbonate, dissolving the carbonate in the water, and separating the sulphur-free carbonate from the insoluble residue.

2. In a continuous process for the production of a sulphur-free sodium carbonate from a sodium-sulphur salt of the group consisting of sodium sulphate, sodium acid sulphate and sodium sulphide; the steps comprising heating a mixture of the starting sodium salt and a reacting agent of the group consisting of the hydroxide, oxide, and carbonate of the metals calcium, barium, and lead above the melting temperature of the mixture, flowing and quenching the molten mixture into water, and reacting it before such quenching with water and a carbon agent of the group consisting of calcium carbonate and carbon dioxide thereby to produce sodium carbonate, and dissolving such sodium carbonate in the water and thereby separating the sulphur-free carbonate from the other products of the reaction.

3. In a continuous process for the production of a sulphur-free sodium carbonate from a sodium sulphate; the steps comprising heating a mixture of the starting sodium sulphate and a reacting agent of the group consisting of the hydroxides of the metals calcium, barium, and lead, above the melting temperature of the mixture, flowing the molten mixture into water, and reacting it during such flow with water and carbon dioxide to produce sodium carbonate, and dissolving such carbonate in the water and thereby separating the sulphur-free carbonate from the other products of the reaction.

4. The continuous process as in claim 3 and wherein the reacting agent is lime.

5. The continuous process as in claim 2 and wherein the melting is performed in the hot zone of a furnace sealed against air admission, and wherein the carbon dioxide is applied along with water to the molten mixture issuing from the furnace, and wherein the products are collected in a vessel in which the sodium carbonate is separated by solution in water.

DANIEL GARDNER.